Jan. 20, 1942. C. G. SWANSON 2,270,355
TELESCOPING MEASURING RULE
Filed July 11, 1941
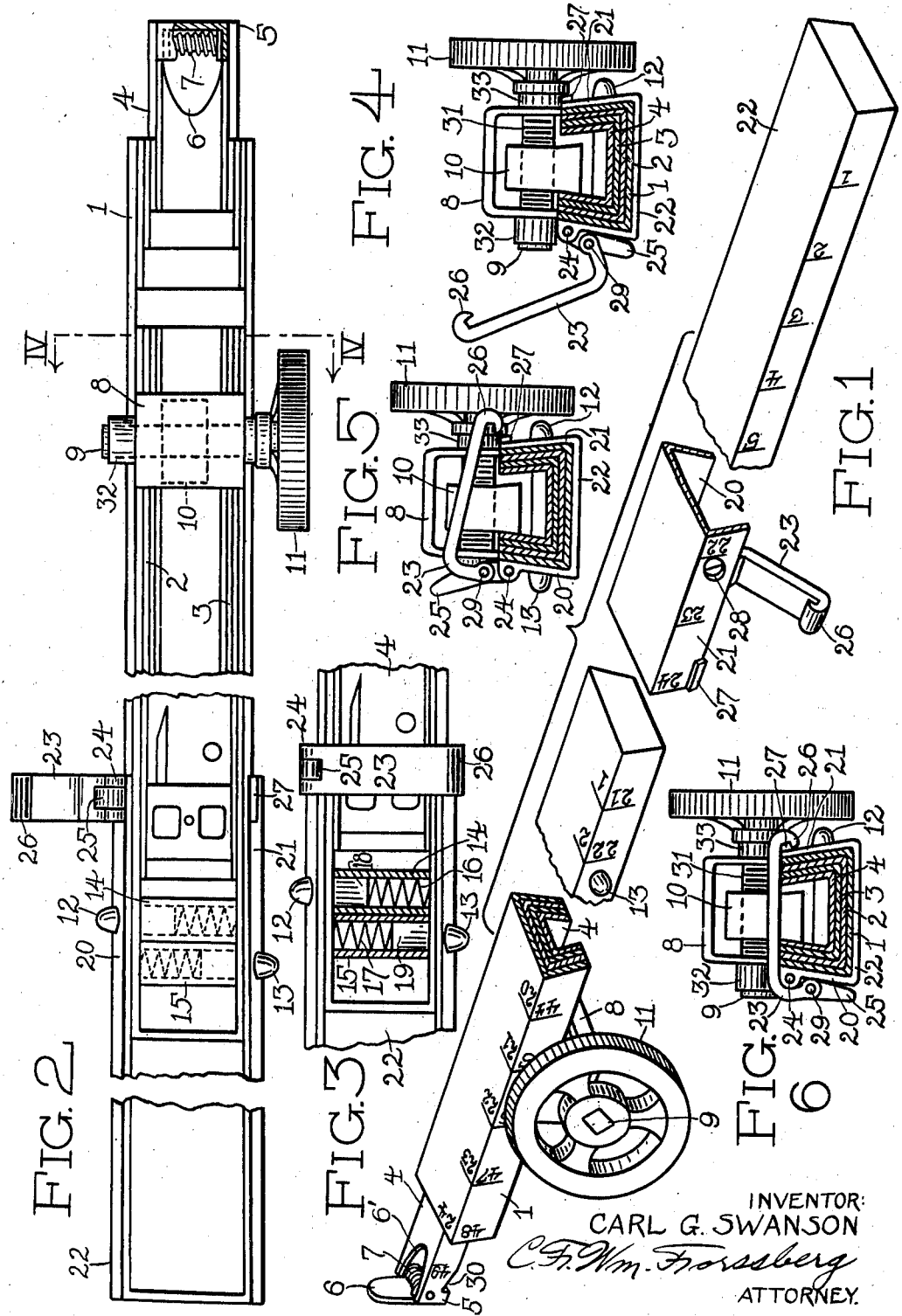
INVENTOR:
CARL G. SWANSON
ATTORNEY.

Patented Jan. 20, 1942

2,270,355

UNITED STATES PATENT OFFICE 2,270,355

TELESCOPING MEASURING RULE

Carl G. Swanson, New York, N. Y.

Application July 11, 1941, Serial No. 401,887

6 Claims. (Cl. 33—161)

The present invention relates to certain features of extensible or telescoping measuring rules made up of a series of telescoping rule sections which may either be extended as required or telescoped into each other in order to occupy a minimum of space, and refers particularly to a detachable auxiliary rule section for such a rule.

The main object of my invention is to provide a rule of the mentioned type with an auxiliary rule section having effective clamping means for locking said section upon the other sections of the rule in any attained position thereon so as to retain the same assembled with said rule and in telescoped condition actually form a casing for the same.

Another object is to have automatic locking means on the rule for retaining the auxiliary rule section in accurate extended position on the rule, said locking means being manually releasable at will.

A further object is to have resiliently erected hook means on the end of the rule mentioned adapting the end of said rule to engage with the edge of a door or board in order to measure the same, and to have sets of scale markings on the auxiliary rule section.

Other objects include simplicity of construction of the rule, economy of manufacture, practical form and easy operation, as well as durability of the whole.

Additional objects and the various advantages of my invention and its principles of construction and operation will appear more in detail as this specification proceeds, when taken together with the accompanying drawing forming part hereof, and in which Figure 1 is a perspective view of a telescoping measuring rule embodying features of the invention together with an auxiliary, some portions being sectioned out to reveal the construction and bring the entire view of the rule on the sheet.

Figure 2 is a fragmentary top or plan view of the same showing the auxiliary rule section and portions of the other rule sections telescoped, with means for locking and unlocking said rule section.

Figure 3 is another fragmentary view of merely a portion of Figure 2 showing parts in section and others in altered positions to indicate operation.

Figure 4 is a transverse section of the device of Figure 2 as taken on line IV—IV showing a cross clamp in open position.

Figure 5 is a similar section of the same showing the cross clamp in initially closed position.

Figure 6 is another similar section showing the same cross clamp in finally closed locking position.

Throughout the views, the same references indicate the same or like parts.

The present is in the nature of an improvement over my copending application Serial No. 341,677 filed June 21, 1940.

In the practice of my invention, and referring to Figures 1 and 2, the rule which mainly forms the invention in said copending application includes a series of telescoping rule sections 1, 2, 3, and 4, it being understood that I may use more, if desired, each section being of any convenient length. As shown in the three first views, each of these sections comprises a channel or U-shaped member which in the telescoped condition of the rule are nested together, each being slidable inside the next succeeding outer section.

At the end 5 of the innermost section 4 is mounted a hook member which is swingable from a vertical position at 6 to a collapsed position in a recess 6' in said rule section in which position it is possible to push this section into the other sections in fully telescoped condition. A spiral spring 7 is associated with this hook member and tends to urge the same into erect position as soon as the section 4 is partly extended from the other sections, making it convenient to engage said member 6 against the end of a board or table or the edge of a door in order to measure the same by means of the rule. Beneath the same end of section 4 is a cutout portion 30 for obtaining a fingerhold on said section in order to start pulling it out when the rule is to be used.

Upon the outermost section 1 is fixed a yoke or bridge 8 which provides bearing means for a threaded shaft 9 to which is fixed a clamping wheel 11 by which to rotate said shaft at will. Upon the threaded portion of the same shaft is mounted a clamping block 10 adapted to clamp the walls of the rule sections together by friction when said block has been screwed over to either side by shaft 9, the thread 31 thereon being naturally effective in either direction of rotation. The collars 32 and 33 retain the shaft in position and are of such diameter as to clear the upper edge of another rule section now to be described in detail.

Upon the exterior of the outermost rule section 1 project two bullet catches 12, 13 projecting through the side walls thereof and having slidable shanks 18 and 19, respectively located within casings 14 and 15 and urged resiliently outward by springs 16 and 17. To this rule section may be applied an auxiliary rule section 22 which is open at one end and closed at the other, by sliding said section in upon section 1 until the mentioned bullet catches engage in apertures in the side walls 20 and 21 in section 22, as for example, the head 13 of one bullet catch in aperture 28 in wall 21. In the engaged position, the auxiliary section 22 forms an extension upon the rule to increase its effective length when the total length of the rule as extended, said auxiliary section having a series of scale markings along a side thereof beginning at the outer closed end of the same and the section 1 of the rule continuing along the edge thereof with the same series. Upon the side uppermost in Figure 1, the rule section 1 begins a different series of markings which omit any connection with the scale markings of the auxiliary section 22. When it is desired to remove said auxiliary section or telescope the same upon the rule, mere pressure of the fingers upon the bullet catches 12 and 13 will depress the same sufficiently to allow the walls 20 and 21 of the same section to slide over the same in either direction.

However, it is desired to strengthen the combined structure of the rule and the auxiliary rule section, especially when the auxiliary section is in extended position on the rule. Hence, clamping means are included as part of the equipment of the auxiliary rule section, consisting of a manually swingable lever 25 pivoted to wall 20 of the section 22 at 24 and to this lever is pivoted in turn a clamping member 23 at 29, terminating at its free end in a hook 26 adapted to engage a rib 27 fixed upon the corresponding opposite edge on wall 21 of said auxiliary rule section. As may be seen in Figure 4, this clamping member may be swung clear of the yoke 8 with all associated parts so that the auxiliary section may even be fully telescoped with the rule sections, or it may simply be slid in upon the rule section 1 a sufficient distance to allow the bullet catches to engage in their respective apertures in the walls 20 and 21, as already mentioned. The clamping member 23 may then be manually swung over into the position shown in Figure 5, at the same time allowing the lever 25 to swing up into its uppermost positon, after which it will but be necessary to swing this lever down about its pivotal mounting 24 in counter-clockwise direction and the clamping member and lever together will assume the mutually locked positions shown in Figure 6. In this relation of the parts, the auxiliary rule section will be clamped in position on the rule and so firmly held that no danger of breakage or slipping of the assembled rule and auxiliary section will be experienced, and the inner rule sections may be independently operated to obtain the intended measurements.

If the manual lever is again raised by hand to the upper position shown in Figure 5, the clamping member will have its hook 26 released from the rib 27 and said clamping member may again be swung clear as in Figure 4, and the auxiliary section shifted, after duly depressing the catches 12, 13 as previously described. When the mentioned section 22 is fully telescoped with or upon the rule, it may well serve as the casing therefor, the clamping member retaining the whole in assembled condition and preventing accidental separation of said section from the rule.

From the foregoing it is evident that when a telescoping rule is used for greater measurements than was ever intended for said rule, the auxiliary rule section described above will serve admirably as a temporary attachment thereto for adding a predetermined length thereto which may be removed for smaller measurements within the normal range of the rule without the auxiliary rule section.

The actual scale markings used may vary to suit different lengths of rules and rule sections and various applications and purposes for which the rule may be used, and the clamping member may also be modified as to form, so long as clamping means are used, not to mention that the bullet catches may be disposed in the opposite ends of a single casing, if desired and urged outward by a common spring.

Having now fully described my invention, I claim:

1. In an extensible measuring rule having a series of telescoping rule sections, means for determining extreme extended positions of said sections and means for locking said sections in extended positions, the combination of means for preventing complete dissociation of any rule section from the rest, with an auxiliary rule section capable of being removably associated in telescoped and extended positions with the outermost rule section, and manually depressible locking heads resiliently urged outward through the sides of the outermost rule section for engagement in corresponding openings in the sides of said auxiliary rule section to determine an extended position thereof on said outermost section.

2. In an extensible measuring rule having at least two telescoping rule sections, means for determining extreme extended positions of said sections, and releasable means for locking said sections in extended positions, the combination of means at the outer end of one of said rule sections adapting said end to engage and catch against the end or edge of a long or wide object to be measured, including a pivoted lip member at said outer end capable of being erected at a right angle to the general surface of the rule as a whole and also to be swung down into a recess in said surface at said end of said section, and a spring resiliently urging said lip member into said erect position.

3. In an extensible measuring rule having a series of telescoping rule sections, means for determining extreme extended positons of said rule sections and means for locking said sections in extended positions, the combination of means for preventing dissociation of any rule section from the rest, with an auxiliary rule section capable of being removably associated in telescoped and extended positions with the outermost section upon said rule, said auxiliary rule section at least partly surrounding and clasping the outermost section in slidable relation, and clamping means upon said auxiliary rule section for clamping and fixing the same in position upon said outermost rule section at will.

4. In an extensible measuring rule having a series of telescoping rule sections, means for determining extreme extended positions of said rule sections and means for locking said sections in extended positions, the combination of means for preventing dissociation of any rule section from the rest, with an auxiliary rule section capable of being removably associated in telescoped and extended positions with the outermost section upon said rule, and clamping means upon said auxiliary rule section for clamping the same in position upon said outermost rule section, at will, said clamping means including a swingable hooked member connected to one side portion of said auxiliary rule section and adapted to be transversely swung across said section and the portion of said rule when said auxiliary section is associated with said rule, and means upon a correspondingly opposite portion of said auxiliary rule section disposed in a position effective to be engaged by said hooked member.

5. In an extensible measuring rule having a series of telescoping rule sections, means for determining extreme extended positions of said rule sections and means for locking said sections in extended positions, the combination of means for preventing dissociation of any rule section from the rest, with an auxiliary rule section capable of being removably associated in telescoped and extended positions with the outermost section upon said rule, and clamping means upon said auxiliary rule section for clamping the same in position upon said outermost rule section, at will, said clamping means including a swingable manual lever hingedly connected to one side portion of the auxiliary rule section, a clamping member pivotally connected to said lever and having a hook at the outer free end thereof, a projection upon the correspondingly opposite side portion of said auxiliary rule section disposed in a position effective to be engaged by the hook on said clamping member in order to clamp said auxiliary rule section in place on the rule proper at will.

6. In an extensible measuring rule having a series of telescoping rule sections, means for determining extreme extended positions of said rule sections and means for locking said sections in extended positions, the combination of means for preventing dissociation of any rule section from the rest, with an auxiliary rule section capable of being removably associated in telescoped and extended positions with the outermost section upon said rule, and clamping means upon said auxiliary rule section for clamping the same in position upon said outermost rule section, at will, said clamping means including a swingable member connected to one side portion of the auxiliary rule section and having hook means on the outer free extremity thereof, means upon a correspondingly opposite side portion of said auxiliary rule section disposed in a position effective to be engaged by said hook means on said clamping or swingable member, and a closed end upon said auxiliary section, the other end being open to allow said section to be removably slid in upon the outermost section of the rule proper.

CARL G. SWANSON.